United States Patent [19]
Kidwell

[11] Patent Number: 5,209,915
[45] Date of Patent: May 11, 1993

[54] METHOD FOR FLYASH RECYCLING IN A DRY SO2 SCRUBBER

[75] Inventor: John H. Kidwell, Uniontown, Ohio

[73] Assignee: The Babcock & Wilcox Company, New Orleans, La.

[21] Appl. No.: 595,162

[22] Filed: Oct. 10, 1990

[51] Int. Cl.$^5$ .................... C01B 17/00; C01B 17/20; C01B 7/00; B01J 8/00

[52] U.S. Cl. .................... 423/243.01; 423/243.08; 423/244.01

[58] Field of Search ............... 423/243, 244 A, 244 R, 423/243.01, 243.08

[56] References Cited

U.S. PATENT DOCUMENTS

| | | | |
|---|---|---|---|
| 4,178,349 | 12/1979 | Wienert | 423/244 |
| 4,185,080 | 1/1980 | Rechmeier | 423/242 |
| 4,279,873 | 7/1981 | Felsvang et al. | 423/242 |
| 4,324,770 | 4/1982 | Bakke | 423/242 |
| 4,442,079 | 4/1984 | Donelly et al. | 423/239 |
| 4,452,765 | 6/1984 | Peterson et al. | 423/242 |
| 4,519,995 | 5/1985 | Schröfelbauer et al. | 423/244 |
| 4,571,330 | 2/1986 | Krigmont et al. | 423/244 |
| 4,590,049 | 5/1986 | Staudinger | 423/244 |
| 4,600,568 | 7/1986 | Yoon et al. | 423/242 |
| 4,645,652 | 2/1987 | Kimura | 423/235 |
| 4,681,045 | 7/1987 | Dvirka et al. | 110/345 |

OTHER PUBLICATIONS

*Control of SO2 Emissions by Dry Scrubbing*, W. Downs, W. J. Sanders, and C. E. Miller, Presentation to the American Power Conference, Chicago, Ill., Apr. 21–23, 1980.

*Dry Scrubbing Eliminates Wet Sludge*, T. B. Hurst Presentation to the Joint Power Generation Conference, Charlotte, N.C., Oct. 7-11, 1979.

*Dry Scrubber, Flue Gas Desulfurization on High–Sulfur, Coal–Fired Steam Generators: Pilot Scale Evaluation*, B. J. Jankura et al., Presented to the EPA/EPRI Symposium on Flue Gas Desulfurization, New Orleans, LA, Nov. 1–4, 1983.

*Dry Scrubber 10 Years Later*, Brian D. Larson et al., Assoc. of Rural Electric Generating Co-operatives Annual Meeting, Baton Rouge, LA, Jun. 25–27, 1990.

Primary Examiner—Gregory A. Heller
Attorney, Agent, or Firm—Vytas R. Matas; Robert J. Edwards; Daniel S. Kalka

[57] ABSTRACT

A method of removing sulphur oxides from flue gases comprises atomizing a wet alkali slurry into a slurry spray. A pneumatically conveyed dry reactive recycled flyash is supplied in an annular pattern around the slurry spray to efficiently utilize the flyash without experiencing difficulties which were experienced in the prior art with regard to a wet mixture of the flyash.

3 Claims, 2 Drawing Sheets

METHOD FOR FLYASH RECYCLING IN A DRY $SO_2$ SCRUBBER

FIELD AND BACKGROUND OF THE INVENTION

The present invention relates in general to $SO_2$ scrubbing, and in particular to a new and useful method that takes into account recycled flyash.

Dry $SO_2$, scrubbing is a process where a mixture of water, lime, and flyash is injected and mixed with a hot flue gas stream to reduce the $SO_2$ content in the flue gas stream. As the $SO_2$ scrubbing process proceeds, the temperature of the flue gas decreases due to the quenching effect of the water. Also, any by-product for the process (e.g., reacted lime, flyash, etc.) will exit the system as a dry material.

The mixture of water, lime, and flyash is injected into the flue gas stream as a slurry that is atomized to small particles by a dual-fluid atomizer. The atomized slurry is then mixed with the flue gas by the increased turbulence and swirling motion introduced into the flue gas by a specialized nozzle structure known by the trademark Turbo-Diffuser.

To increase the $SO_2$ absorption in the dry scrubber while minimizing lime consumption, it is necessary to recycle reactive flyash from the system through the atomizers. The method involves preparation of a flyash slurry, subsequent mixing with a lime slurry and then the pumping and transport to and through the atomizers as described in U.S. Pat. No. 4,452,765 which is hereby incorporated by reference.

A technical paper, "Comparison of Dry Scrubbing Operation of Laramie River and Craig Stations" presented by J. B. Doyle, B. J. Jankura, and R. C. Vetterick to the Symposium on Flue Gas Desulfurization in Atlanta, Ga, Nov. 16–21, 1986, discusses the advantage of using high-alkali ash, along with the problems caused when using this ash. A technical paper, "Dry $SO_2$ System Design and Early Operating Experience at Basin Electric's Laramie River Station", presented by G. L. Anderson, W. DePriest, and E. I. Edwards to the ASME Joint Power Generation Conference in Denver, Co, Oct. 17–21, 1982 discloses that the key to an effective dry sulfur removal process is intimate gas/slurry contact. This reference teaches using three independent alkali preparation processes: a lime slurry preparation, a recycle ash slurry preparation, and water conditioning.

U.S. Pat. No. 4,645,652 discloses the use of a dry alkaline reactant, which includes flyash, pneumatically injected into a duct.

None of the references disclose pneumatically injected recycled flyash supplied simultaneously with humidification into a highly turbulent flow region at the exit of the atomizer for assisting in mixing the air/flyash mixture with the lime slurry spray.

SUMMARY OF THE INVENTION

It is known from experience that mixing of recycled flyash with lime slurry presents severe problems which result in numerous shutdowns and high maintenance. These range from difficulty in screening and achieving a uniform, consistent slurry to excessive pluggage and severe erosion and wear of piping, valves and atomizers.

According to the present invention, pneumatic transport is used for the recycled flyash and it is introduced in dry form into the lime slurry in a turbulent zone near the discharge from the atomizer. The invention does not propose using an atomizer passage to inject the ash.

The flyash is drawn from a hopper, screened dry, and then transported pneumatically to a Turbo-Diffuser nozzle. The air/fly ash mixture is introduced through an annular passage surrounding a vent tube and injected into the system with the lime slurry spray exiting the atomizer. The air/fly ash mixture mixes with the lime slurry spray in the highly turbulent flow region at the exit of the atomizer. The high velocity jet of lime slurry exiting the atomizer enhances the mixing and wetting of the flyash through the flow entrainment characteristic of the jet. After the flyash is wetted with the lime slurry, it reacts and removes the $SO_2$ in the flue gas providing an improvement in the $SO_2$ removal.

Accordingly, an object of the present invention is to provide a method of removing sulfur oxides from flue gas, comprising: forming a wet alkali slurry; atomizing the slurry into a slurry spray; pneumatically conveying a dry reactive recycled flyash in an annular pattern around the slurry spray to mix the dry flyash with the wet slurry spray; and supplying dry flue gas in an annular pattern around the mixture of slurry spray and flyash.

The various features of novelty which characterize the invention are pointed out with particularity in the claims annexed to and forming a part of this disclosure. For a better understanding of the invention, its operating advantages and specific objects attained by its use, reference is made to the accompanying drawinqs and descriptive matter in which the preferred embodiment of the invention is illustrated.

DESCRIPTION OF THE PREFERRED EMBODIMENT

Figure 1:
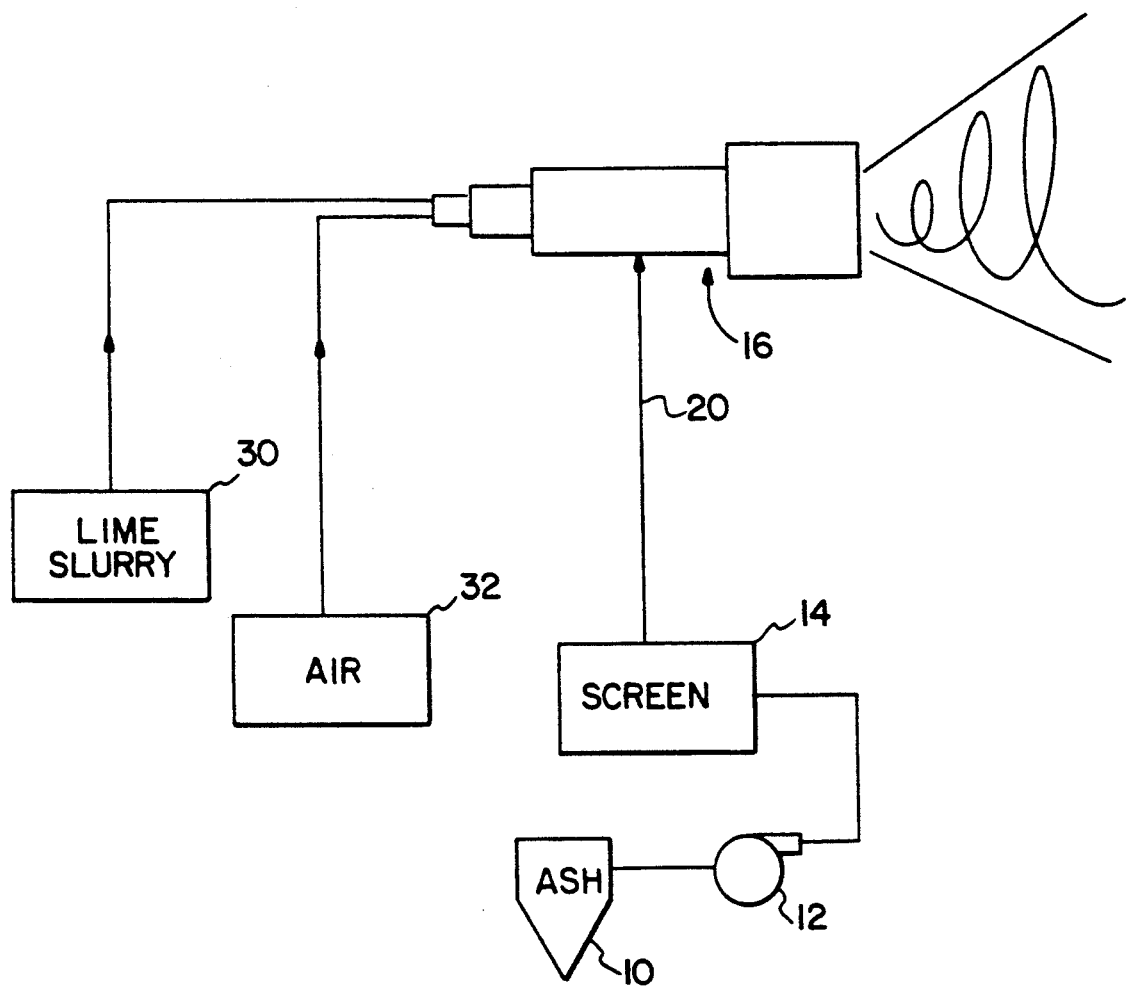
FIG. 1 is a schematic block diagram of an arrangement used to practice the present invention.

Referring to the drawings in particular, the invention embodied therein comprises a method of removing sulphur oxides from flue gas with the use of a wet alkali slurry and a dry pneumatically conveyed reactive recycled flyash.

Figure 2:
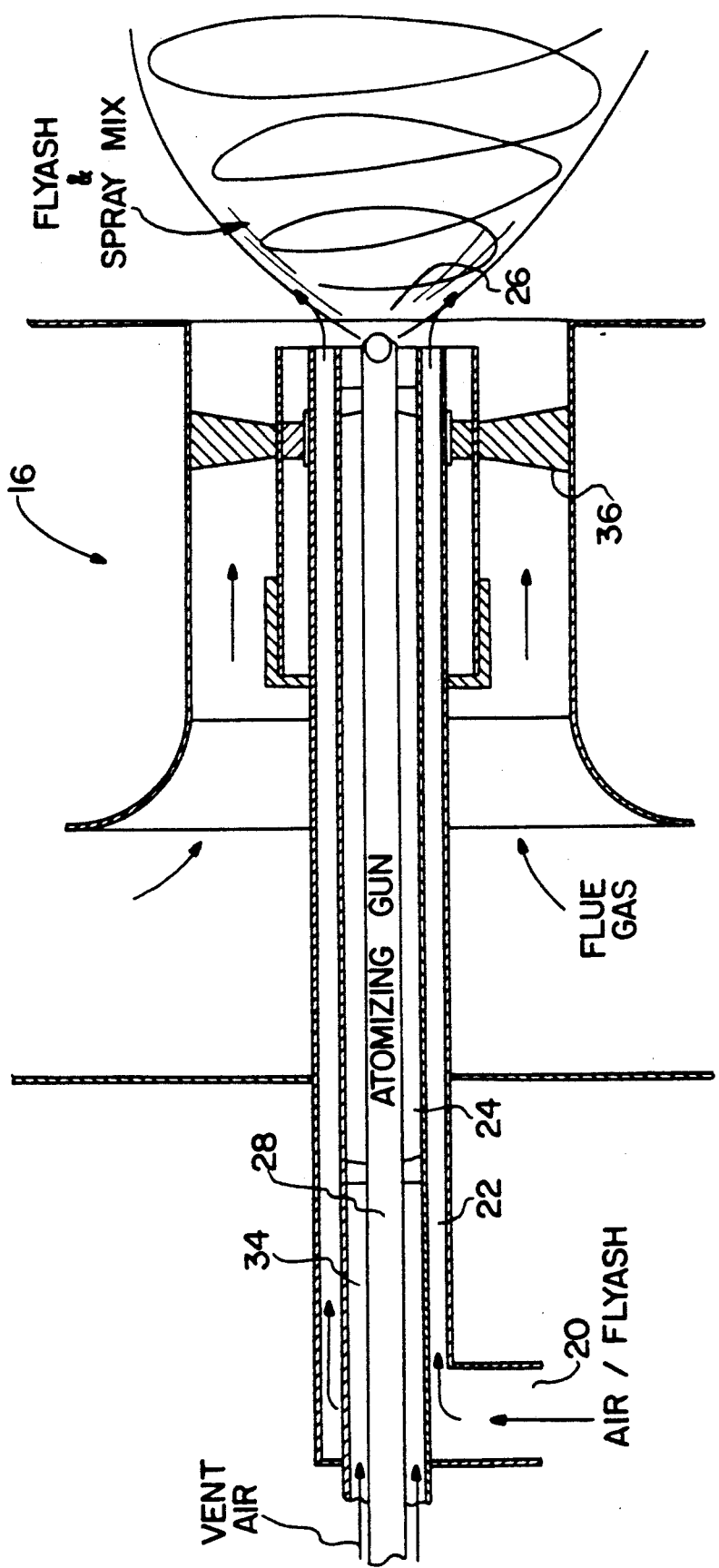
FIG. 2 is a sectional view of nozzle with supply conduits for practicing the present invention.

As shown in FIG. 1, flyash removed from the flue gas in a known manner is drawn from a hopper 10 by a blower 12, screened dry at 14, then conveyed pneumatically to the Turbo-Diffuser nozzle 16. At the nozzle the air/flyash mixture 20, as shown in FIG. 2, is introduced through an annular passage 22 surrounding a vent tube 24 and injected into a lime slurry spray 26 exiting an atomizer 28 near the point of origin of the spray 26. The air/flyash mixture 20 mixes with the lime slurry spray in the highly turbulent flow region at the exit of the atomizer. The high velocity jet of lime slurry exiting the atomizer will enhance the mixing and wetting of the flyash by the flow entrainment characteristic of the jet.

Vent air 34 discharged from vent tube 24 prevents slurry deposit and build-up on and around the atomizer 28.

Once the flyash is wetted with the lime slurry, it will then react and remove the $SO_2$ in the flue gas and provide an improvement in the $SO_2$ removal.

This method of flyash injection in the dry SO₂ scrubber has the following advantages:

1. Elimination of the preparation of ash slurry and the mixing and pumping problems thereof.
2. Allowing the use of conventional and well-known dry pneumatic conveying and injection techniques.
3. Elimination of atomizer erosion due to flyash particles.
4. Simplification of system control.
5. Increase reliability and availability of the flyash recycle system.
6. Permits recycling of increased amounts of flyash as necessary and perhaps transporting in dilute to near dense phase.
7. Reduction of system cost and maintenance requirements.

As shown in FIG. 1, the wet line slurry is supplied from conventional equipment schematically shown at 30, to the atomizer of the nozzle 16. Vent air is supplied from an apparatus 32, to an annular chamber 34 around the atomizer as shown in FIG. 2.

The nozzle 16 includes angled vanes 36 for swirling or spinning the flue gas to produce a circular flow pattern at the nozzle outlet. The turbulence created by the swirling flue gas and the flow entrainment caused by the jets exiting the atomizer mix the dry flyash and the wet spray, with the flue gas to absorb sulphur oxides.

While a specific embodiment of the invention has been shown and described in detail to illustrate the application of the principles of the invention, it will be understood that the invention may be embodied otherwise without departing from such principles.

What is claimed is:

1. A method of removing sulfur oxide from flue gas, comprising the steps of:
    forming a wet alkali slurry;
    atomizing the slurry with an atomizer into a slurry spray;
    supplying a vent air in a first annular conduit around the atomizer;
    pneumatically supplying a dry reactive recycled flyash in a second annular conduit around the first annular conduit to inject and mix the dry flyash simultaneously with the wet slurry spray; and
    supplying dry flue gas in an annular pattern around the mixture of slurry spray and flyash.

2. A method according to claim 1, including swirling the flue gas to swirl the mixture of slurry spray and flyash to further mix the structure.

3. A method according to claim 1, including supplying the flue gas in a third annular conduit around the second annular conduit.

* * * * *